INVENTOR.
HARRY S. JONES
BY C. B. Spangenberg
ATTORNEY

Sept. 25, 1945.   H. S. JONES   2,385,447
MEASURING AND CONTROL APPARATUS
Filed Nov. 4, 1942   2 Sheets-Sheet 2

*INVENTOR.*
HARRY S. JONES
BY C. B. Spangenberg
ATTORNEY.

Patented Sept. 25, 1945

2,385,447

UNITED STATES PATENT OFFICE 2,385,447

MEASURING AND CONTROL APPARATUS

Harry S. Jones, Washington, D. C., assignor to The Brown Instrument Company, Philadelphia, Pa., a corporation of Pennsylvania Application November 4, 1942, Serial No. 464,534

7 Claims. (Cl. 172—239)

The present invention relates to an improved method of and apparatus for making accurate measurements of minute electrical currents or voltages.

A general object of the invention is to provide a method of eliminating the effects of stray electrical fields or spurious electrical effects upon the operation of apparatus designed for accurately measuring the magnitude or changes in magnitude of minute electrical currents or voltages.

A specific object of the invention is to provide a method of eliminating the effects of extraneously induced alternating currents upon the operation of apparatus designed for making accurate measurements of the magnitude and changes in magnitude of minute unidirectional electrical currents flowing in low resistance circuits.

A more specific object of the invention is to provide a self balancing potentiometer instrument which incorporates the approved practices of the art in respect to many of its features and which embodies provisions for eliminating the effects of stray electrical fields or spurious electrical currents upon the operation of the instrument and thereby upon the measurement obtained.

In making accurate measurements of small unidirectional electrical currents flowing in low resistance circuits, for example, in potentiometric measuring circuits utilized for measuring the electromotive forces produced by a thermocouple, considerable difficulty has been encountered in the prior art because of the introduction of extraneous fluctuating or alternating currents into the potentiometric measuring circuits. Such fluctuating or alternating currents may be introduced into the potentiometric measuring circuits by induction from stray alternating current fields in the vicinity of the apparatus, or may be introduced therein by means of abnormal circuit paths established between the thermocouple and the potentiometric measuring circuit and including an alternating current source.

Accordingly, it is a specific object of the present invention to provide simple and efficient means for eliminating the effects of such extraneously induced alternating currents or spurious electrical effects upon the operation of potentiometric measuring apparatus arranged for accurately measuring the magnitude and changes in magnitude of minute unidirectional electrical currents.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Figure 1:
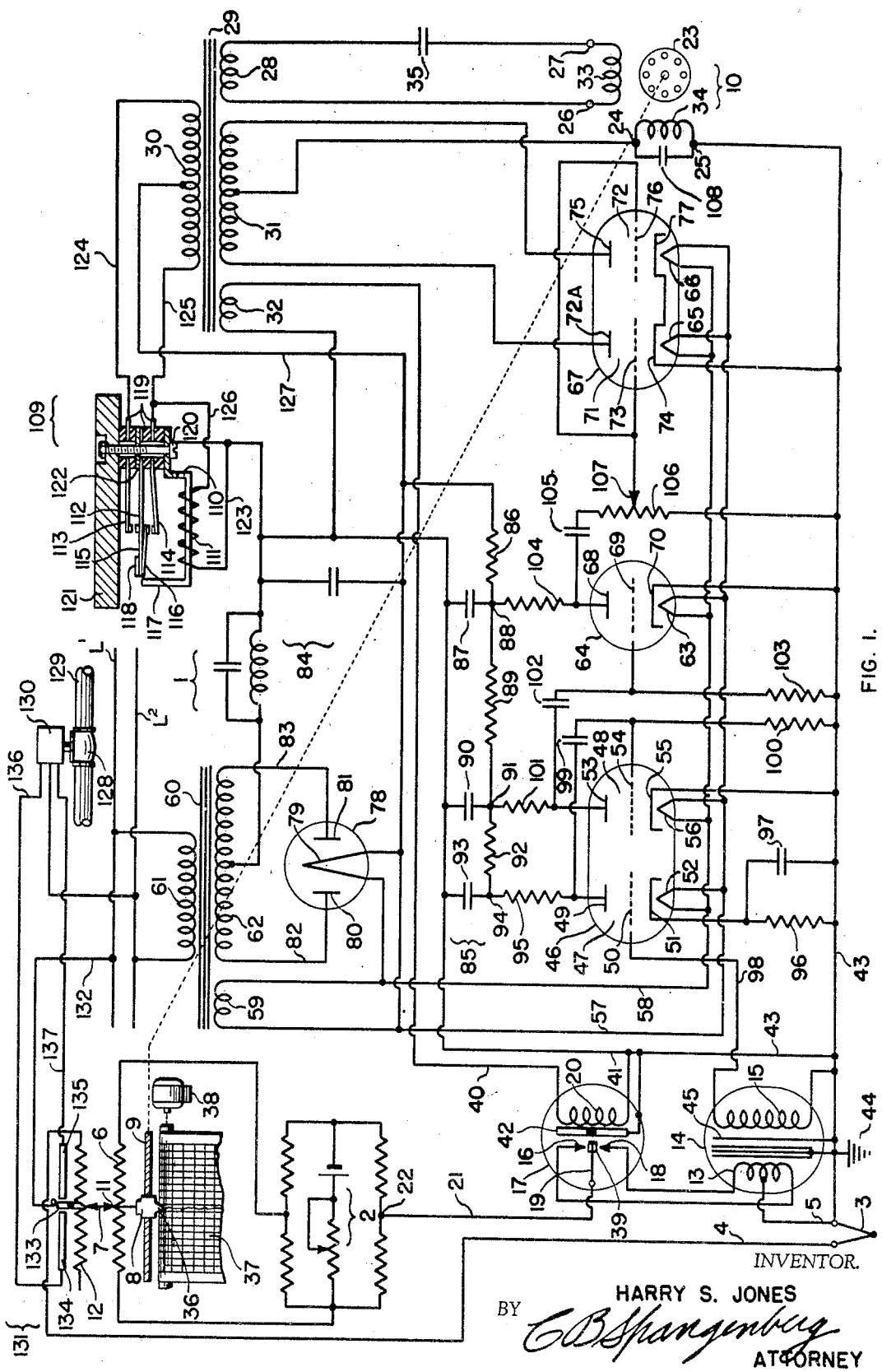
Fig. 1 is a diagrammatic illustration of one embodiment of my invention.

Referring to Fig. 1 of the drawings there is illustrated in schematic form an electronic device generally designated by the reference character 1 for producing effects in accordance with the extent of unbalance of a potentiometric measuring circuit 2 which controls the operation of the electronic device 1. The potentiometric circuit 2 is unbalanced in accordance with the variations in a quantity to be measured and because of the small magnitude of the unbalanced electromotive forces produced in the potentiometric measuring circuit it is not practicable nor desirable to have the said effects produced directly by the potentiometric circuit.

More specifically, an arrangement is illustrated in Fig. 1 of the drawings for measuring and recording the temperature of a furnace (not shown) in the interior of which a thermocouple 3 is arranged which is responsive to slight changes in the temperature of the furnace. The thermocouple which may be located at a distance from the remainder of the potentiometric measuring circuit has its terminals connected by a pair of conductors 4 and 5 to the terminals of the potentiometric measuring circuit 2 which preferably is of the null point type. The potentiometric circuit 2 includes a slidewire resistance 6 and an associated contact 7 which is adapted to be moved along the length of the slidewire 6. It will be understood that the potentiometric circuit 2 illustrated schematically in the drawings may be of any suitable type such as the Brown potentiometric type disclosed in Patent 2,150,502 issued to T. R. Harrison, E. H. Grauel and J. E. Kessler on March 14, 1939. The movable contact 7 is attached to a suitable carrier which, for example, may be in the form of an internally threaded nut 8 adapted to ride on a screw threaded rod 9 which is rotated in one direction or the other under control of the thermocouple 3. A suitable reversible electrical motor generally designated by the reference numeral 10 is mechanically coupled in any convenient manner to the screw threaded rod 9 to rotate the latter at the desired speed and in the desired direction to thereby move the contact 7 along slidewire resistance 6 to re-balance the potentiometric measuring circuit 2 whenever the latter is unbalanced.

The contact 7, as shown, is a bridging contact connecting the point 11 of the slidewire 6 to a corresponding point of a slidewire resistance 12 which is arranged alongside the resistance 6. The resistance 12 has one end connected by the conductor 4 to one terminal of the thermocouple 3 and is employed for the purpose of avoiding measurement inaccuracies due to variations in resistance to the flow of current generated by the thermocouple 3 which would otherwise result from variations in the relative resistances of the portions of the resistance 6 at opposite sides of the point 11. The other terminal of the thermocouple 3 is connected by means of the conductor 5 to the center tap on the primary winding 13 of a transformer 14 having a secondary winding 15. One end terminal of the primary winding 13 is connected to a contact 16 of a current interrupting device designated generally at 17 and the other end terminal of the primary winding 13 is connected to a contact 18 of the device 17. The current interrupting device 17 may be of the type disclosed in the copending Harrison et al. Patent 2,300,742 issued November 3, 1942, from application, Serial No. 240,594, filed November 15, 1938, and includes a vibrating reed 19 and an energizing winding 20 in addition to the contacts 16 and 18. The vibrating reed is positioned between the contacts 16 and 18 and is adapted to engage the latter contacts in alternation. The vibrating reed 19 is connected by a conductor 21 to the point 22 of the potentiometric measuring circuit 2.

With the arrangement disclosed in the drawing the flow and the direction of flow of current through the circuit branch from the point 22 of the potentiometric measuring circuit 2 to the current interrupting device 17, the transformer 14, the thermocouple 3, and the bridging contact 7 to the point 11 on the measuring circuit 2 depends upon the relation between the electromotive force produced by the thermocouple 3 and the potential difference between the potentiometric circuit points 11 and 22. The thermocouple 3 is so connected to the potentiometric circuit that the electromotive force of the thermocouple opposes the potential difference between the points 11 and 22. The potential difference between the points 11 and 22 is increased and decreased by movement of the contact 7 to the left and to the right, respectively. With suitable adjustments of the contact 7 the potential difference between the points 11 and 22 will be equal and opposite to the electromotive force produced by the thermocouple 3 and no current will flow through the above mentioned circuit branch including the current interrupting device 17, the transformer 14 and the thermocouple 3. On an increase in the thermocouple electromotive force above the potential difference between the points 11 and 22 current will flow in one direction through the interrupter 17 and the transformer primary winding 13 and such current flow may then be eliminated by a suitable adjustment of the bridge contact 7 to the left. Conversely, when the electromotive force of the thermocouple 3 falls below the potential difference between the potentiometric circuit points 11 and 22, the resultant current flow through the interrupting device 17 and the transformer primary winding 13 will be in such a direction to be eliminated by a suitable adjustment of the contact 7 to the right.

As is illustrated more or less diagrammatically in the drawings the bridging contact 7 is adjusted along the slidewire resistances 6 and 12 by the operation of the reversible electrical motor 10 which is shown as having its rotor 23 mechanically coupled to the threaded shaft 9 on which the carriage 8 which supports the bridging contact 7 is mounted. The reversible electrical motor 10 has a pair of terminals 24 and 25 which are connected to the output circuit of the electronic device 1 and also has a pair of terminals 26 and 27 which are connected to the secondary winding 28 of a transformer 29 having a primary winding 30 which is energized from a suitable source of alternating current produced in the manner described hereinafter. The transformer 29 is also provided with secondary windings 31 and 32.

For its intended use the motor 10 may be of the form diagrammatically shown in the drawings and comprising the rotor 23 and two pairs of oppositely disposed field poles (not shown) on one pair of which a winding 33 is wound and on the other pair of which a winding 34 is wound. Winding 33 has its terminals connected to the motor terminals 26 and 27 and is supplied with energizing current from the transformer secondary winding 28 through a condenser 35 of suitable value. Due to the action of the condenser 35 the current which flows through the motor winding 33 will lead the voltage produced across the terminals of the transformer secondary windings 28 by approximately 90°. The current supplied to the winding 34 of the motor 10 by the electronic device 1 is in phase with or is displaced 180° with respect to the voltage produced across the terminals of the transformer secondary winding 28 and establishes the field in rotor 23 which is displaced 90° in one direction or the other with respect to that established therein by the winding 33. Reaction between the field set up by the winding 33 with that set up by winding 34 establishes a rotating field in the rotor which rotates in one direction or the other depending upon whether the winding 34 is energized with current in phase with the voltage produced across the terminals of the transformer secondary winding 28 or displaced 180° in phase therewith, and thereby, as is explained in detail hereinafter, in accordance with the direction of unbalance of the potentiometric measuring circuit 2. The direction and duration of rotation of the motor 10 is controlled in accordance with the direction and extent of unbalance of the potentiometric measuring circuit 2 so that on rotation of the motor the bridging contact 7 is adjusted in the proper direction to rebalance the potentiometric circuit 2.

If desired, a pen 36 may be mounted on the carriage 8 which carries bridging contact 7 and arranged in cooperative relation with a recorder chart 37 to thereby provide a continuous record of the temperature to which the thermocouple 3 is subjected. The chart 37 may be a strip chart as shown and is adapted to be driven in any convenient manner as, for example, by a unidirectional electrical motor 38 through suitable gearing (not shown) so that a record of the temperature to which the thermocouple 3 is subjected will be recorded as a continuous line on the chart 37.

The current interrupting device 17 illustrated schematically in the drawings operates to convert the potentiometric unbalanced unidirectional currents into alternating currents in the transformer secondary winding 15 which are capable of being readily amplified and comprises the vibrating reed 19 for operating a contact 39 with respect to the relatively fixed contacts 16 and 18. The vibrating reed 19 is vibrated under the influence of the winding 20 which is connected to the winding 32 of the transformer 29 by conductors 40 and 41 and is supplied with alternating current therefrom. A permanent magnet 42 associated with the vibrating reed 19 is provided for polarizing and synchronizing purposes.

Fundamentally, the current interrupting device 17 is a polarized switching mechanism, the operating winding 20 and the permanent magnet 42 cooperating to vibrate the vibrating reed 19 at the same frequency as the frequency of the alternating voltage supplied by the transformer secondary winding 32. For purposes of illustration it may be assumed that the contact 39 is in engagement with the contact 16 during the first half cycle of the alternating voltage supplied the winding 20, for example, when the upper terminal of the winding 20 is positive with respect to the lower terminal thereof, and that the contact 39 is in engagement with the contact 18 during the second half cycle when the upper terminal of the winding 20 is negative with respect to the lower terminal thereof.

When the potentiometric measuring circuit 2 is balanced no current flows in the circuit between the potentiometer points 11 and 22 and including the contacts 39, 16 and 18, the transformer primary winding 13 and the thermocouple 3. When the temperature to which the thermocouple 3 is subjected increases the unbalanced unidirectional current in the potentiometer circuit flows in the direction from the potentiometer point 22 through the conductor 21 to the current interrupting device 17, transformer primary winding 13, the thermocouple 3 and the bridging contact 7 to the potentiometer point 11. Conversely, when the temperature to which the thermocouple 3 is subjected decreases the unbalanced unidirectional current in the potentiometer circuit flows in the opposite direction, namely from the potentiometer point 11 to the potentiometer point 22.

When the temperature to which the thermocouple 3 is subjected increases, during the first half cycle of the alternating voltage supplied to the winding 20 of the device 17 the unbalanced potentiometer unidirectional current flows from the potentiometer point 22 through the conductor 21 to the reed 19, contact 16 to the lower end of the transformer primary winding 13 through the lower half of the winding 13 to the conductor 5, thermocouple 3, conductor 4 and the bridging contact 7 to the potentiometer point 11. This current flow through the lower half of the transformer primary winding 14 operates to induce a voltage in the transformer secondary winding 15 causing the upper terminal of the latter to be positive with respect to the lower terminal, for example. During the second half of the alternating voltage supply to the winding 20 the unbalanced unidirectional potentiometer currents flow from the point 22 of the potentiometer circuit through the conductor 21 to the vibrating reed 19, contact 39, contact 18 to the upper terminal of the transformer primary winding 13, through the upper half of the winding 13 to the conductor 5, to conductor 4 and the bridging contact 7 to the potentiometer point 11. This flow of current in the upper half of the transformer primary winding 13 causes the induction of a voltage in the transformer secondary winding 15 of the polarity to make the upper terminal of the winding 15 negative with respect to the lower terminal. Therefore, it will be seen that with the arrangement shown and described an alternating voltage is produced across the transformer secondary winding 15 which is in phase with the alternaitng voltage supplied the winding 20 of the current interrupting device 17 and is of the same frequency as supplied the winding 20.

Upon a decrease in the temperature to which the thermocouple 3 is subjected, the unbalanced potentiometer unidirectional currents flow from the potentiometer point 11 to the point 22. During the first half cycle of the alternating voltage supplied the winding 20 current flows from the potentiometer point 11 through the bridging contact 7, resistance 12, conductor 4, thermocouple 3, conductor 5, the lower half of the transformer secondary winding 13 to the contact 16 of the device 17, the vibrating reed 19 and conductor 21 to the potentiometer point 22. This flow of current through the lower half of the transformer primary winding 13 causes the induction of a voltage in the transformer secondary winding 15 of the proper polarity to cause the upper terminal of the winding 15 to become negative with respect to the lower terminal. During the second half of the alternating voltage supplied the winding 20 the unbalanced potentiometer unidirectional current flows from the potentiometer point 11 through the bridging contact 7, resistance 12, conductor 4, the thermocouple 3, conductor 5, the upper half of the transformer primary winding 13, contact 18, contact 39, the vibrating reed 19, contact 21 to the potentiometer point 22. This current flow through the upper half of transformer primary winding 13 operates to induce a voltage in the transformer secondary winding 15 to cause the potential of the upper terminal to become positive with respect to the lower terminal. Accordingly, when the temperature to which the thermocouple 3 is subjected decreases, an alternating voltage of the opposite phase is produced across the transformer secondary winding 15.

Summarizing, when the potentiometric measuring circuit 2 is balanced there is no current flow through the transformer primary winding 13 and hence no voltage is induced in the transformer secondary winding 15. Upon an increase in the temperature to which the thermocouple 3 is subjected the flow of potentiometer unbalanced current through the transformer primary winding 13 operates to cause the induction of an alternating voltage in the transformer secondary winding 15 which is in phase with the alternating voltage supplied the winding 20 of the current interrupting device 17. Conversely, upon a decrease in the temperature to which the thermocouple 3 is subjected the flow of potentiometer unbalanced current through the transformer primary winding 13 causes the induction of an alternating voltage in the transformer secondary winding 15 which is approximately 180° out of phase with the alternating voltage supplied the winding 20.

The electronic device 1 includes a conductor 43 which is grounded at 44. The permanent magnet 42 and the mounting structure of the current interrupting device 17, the core structure of the transformer 14, and a shield 45 provided in the transformer 14 between the primary and secondary windings are connected through the conductor 43 to ground 44, as is also the center tap on transformer primary winding 13.

The electronic device 1 also includes an electronic tube 46 to the input circuit of which the alternating voltage produced across the terminals of the transformer secondary winding 15 is applied. The electronic tube 46 includes two heater type triodes designated by the reference numerals 47 and 48 within the same envelope. The triode 47 includes an anode 49, a control electrode 50, a cathode 51 and a filament 52, and the triode 48 includes an anode 53, a control electrode 54, a cathode 55 and a filament 56. The filaments 52 and 56 are connected in parallel and receive energizing current through conductors 57 and 58 from the secondary winding 59 of a transformer 60 having a line voltage winding 61 and a secondary winding 62. The primary winding 61 of transformer 60 is connected to and receives energizing current from the alternating current supply conductors L¹ and L² which supply alternating current of commercial frequency, for example 60 cycles, to the winding 61. The transformer secondary winding 59 is also connected by the conductors 57 and 58 to the filament 63 of an electronic tube 64 and to the filaments 65 and 66 of an electronic tube 67. The filaments 52, 56, 63, 65 and 66 are all connected in parallel.

The electronic tube 64 is a triode and includes an anode 68, a control electrode 69, and a cathode 70 in addition to the filament 63. The electronic tube 67 includes two triodes designated by the reference characters 71 and 72 in the same envelope. The triode 71 includes an anode 72, a control electrode 73 and a cathode 74 in addition to the filament 65, and the triode 72 includes an anode 75, a control electrode 76, and a cathode 77 in addition to the filament 66.

An electronic valve 78 is also provided which valve may be a conventional full wave rectifier and is employed to provide a source of direct current voltage for energizing the anode circuits of the electronic valves 47, 48 and 64. Valve 78 includes a filament type cathode 79 and anodes 80 and 81. The filament cathode 79 of valve 78 is connected to the transformer secondary winding 59 and receives energizing current therefrom. The anodes 80 and 81 are connected by conductors 82 and 83 to the terminals of the transformer secondary winding 62 and the rectified current is connected across the input terminals of a suitable filter designated generally by the reference numeral 84. A center tap on the transformer secondary winding 62 is connected to one terminal of the filter 84 and the filament cathode 79 is connected to the other terminal of the filter 84 so that a direct current voltage is maintained across the filter.

The direct current voltage produced across the output terminals of the filter 84 is applied through a suitable filter indicated at 85 to the anode circuits of the triodes 47, 48 and 64. As illustrated, the filter 85 includes a resistance 86 and a condenser 87 which operate to smooth out the ripple in the output voltage of the filter 84 at the point 88. The direct current voltage obtained at the point 88 is utilized for energizing the anode circuit of the triode 64. The filter 85 also includes a resistance 89 and a condenser 90 for smoothing out the ripples in the direct current voltage at the point 91. Anode voltage is supplied the triode 48 from the direct current voltage obtained at the point 91. The filter 85 also includes a resistance 92 and a condenser 93 for smoothing out the voltage at the point 94 from which anode voltage is supplied the triode 47. Therefore, it will be noted that the filter 85 comprises three stages. Such a three-stage filter is provided because for the most satisfactory and efficient operation it is desirable that the anode voltage supplied the triode 47 be substantially free from ripple whereas it is not necessary to supply anode voltage so completely free from ripple to the anode circuit to the triode 48. Likewise it is not necessary to supply anode voltage as free from ripple to the triode 64 as it is to the triode 48.

The anode circuit of the triode 47 may be traced from the point 94 which comprises the positive terminal of the direct current voltage supply through a fixed resistance 95 to the anode 49, cathode 51, a resistance 96 which is shunted by a condenser 97 to the conductor 43 and thereby to the negative terminal of the direct current voltage supply. The parallel connected resistance 96 and condenser 97 located between the cathode 51 and the conductor 43 are provided for biasing the control electrode 50 negatively with respect to the cathode 51. The input circuit of the triode 47 may be traced from the cathode 51 through the parallel connected resistance 96 and condenser 97 to the conductor 43, the transformer secondary winding 15 and a conductor 98 to the control electrode 50.

The output circuit of the triode 47 is resistance capacity coupled to the input circuit of the triode 48 by means of a condenser 99 and a fixed resistance 100. Specifically, the anode 49 of the triode 47 is connected by the condenser 99 to the control electrode 54 to the triode 48 and the control electrode 54 is connected through the resistance 100 to the conductor 43 and thereby to the cathode 55.

The anode circuit of the triode 48 may be traced from the positive terminal 91 of the direct current voltage source through a fixed resistance 101 to the anode 53, cathode 55 and conductor 43 to the negative terminal of the direct current voltage source.

The output circuit of the triode 48 is resistance capacity coupled to the input circuit of the triode 64 by means of condenser 102 which is connected between the anode 53 and the control electrode 69 and a resistance 103 which is connected between the control electrode 69 and the cathode 70. It is noted the resistances 100 and 103 connected in the input circuits of the triodes 48 and 64, respectively, operate to maintain the control electrodes 54 and 69 at the same potential as their associated cathodes when no voltage is induced the transformer secondary winding 15 and upon the induction of an alternating voltage in the winding 15, resistances 100 and 103 permit the flow of grid current between the control electrodes 54 and 69 and their associated cathodes and thereby limit the extent to which the control electrodes 54 and 69 may go positive with respect to their associated cathode.

The anode circuit of the triode 64 may be traced from the positive point 88 of the direct current voltage source through a fixed resistance 104 to the anode 68, cathode 70, and conductor 43 to the negative terminal of the direct current voltage source. The anode 68 of the triode

64 is resistance capacity coupled by means of a condenser 105 and a resistance 106 to the input circuits of the triodes 71 and 72. As illustrated, the contact 107 which in engagement with the resistor 106 is adjustable along the length of the latter and is provided for varying the point of connection of the control electrodes 73 and 76 of the triodes 71 and 72, respectively to the resistor 106. The resistor 106 and contact 107 perform a dual function, namely limit the extent to which the control electrodes 73 and 76 may go positive with respect to their associated cathodes 74 and 77, and also to vary the proportion of the signal impressed upon the control electrodes 73 and 76 from the anode circuit of the triode 64.

The triodes 71 and 72 are utilized for supplying energizing current to the winding 34 of the motor 10. As illustrated, anode voltage is supplied the anode circuits of the triodes 71 and 72 from the secondary winding 31 of the transformer 29. Specifically, the anode 72A of triode 71 is connected to the left end of the transformer secondary winding 31 and the anode 75 of triode 72 is connected to the right end of winding 31. The cathodes 74 and 77 are connected together and are connected through the motor winding 34 which, as shown, has a condenser 108 connected thereacross to a center tap on the winding 31. It is noted the cathodes 74 and 77 are also connected to the conductor 43 and thereby to ground 44. It will be noted that the signal voltage from the output circuit of the triode 64 is impressed simultaneously and equally on the control electrodes 73 and 76 of the triodes 71 and 72.

This motor driving circuit is disclosed and is being claimed in the Wills U. S. patent application Serial No. 421,173, filed Dec. 1, 1941. For the present purposes it is believed sufficient to note that the motor 10 is preferably so constructed that the impedance of the winding 34 is of the proper value to match the impedance of the anode circuit of the triodes 71 and 72 when the motor is operating in order to obtain the most efficient operation. Preferably, the motor is so constructed that it has a high ratio of inductive reactance to resistance, for example, of the order of from 6–1 to 8–1 at the frequency of the energizing current supplied to it. This provides for maximum power during the running condition of the motor with the least amount of heating, and also provides a low impedance path for braking purposes.

As noted hereinbefore energizing current is supplied to the motor winding 33 from the transformer secondary winding 28 through the condenser 35. The condenser 35 is so selected with respect to the motor winding 33 as to provide a series resonant circuit having a unity power factor. Due to the series resonant circuit the total impedance of winding 33 is substantially equal to the resistance of the winding 33 and since this resistance is relatively low a large current flow through the winding 33 is made possible. This permits the attainment of maximum power and torque from the motor 10. Due to the series resonant circuit the current flow through the motor winding 33 is in phase with the voltage across the terminals of the transformer secondary winding 28. However, the voltage across the motor winding 33 leads the current by substantially 90° because of the inductance of the winding 33.

Energizing current is supplied the motor winding 34 from the transformer secondary winding 31 through the anode circuits of the triodes 71 and 72 through the circuit previously traced.

The condenser 108 connected in parallel with the winding 34 is so chosen as to provide a parallel resonant circuit having a unity power factor. This parallel resonant circuit presents a relatively high external impedance and a relatively low local circuit impedance. The relatively high external impedance is approximately the same as the impedance of the anode circuits of the triodes 71 and 72 and thereby provides efficient operation. The relatively low or internal circuit impedance approximates the actual resistance of the winding 34, and since this resistance is relatively low the impedance of the local circuit is relatively low.

During the first half cycle of the alternating voltage produced across the terminals of the transformer secondary winding 31, the anode 72A of the triode 71 is rendered positive with respect to the center tap on the winding 31 and during the second half cycle the anode 75 is rendered positive with respect to the center tap on the winding 31. Accordingly, the triodes 71 and 72 are adapted to conduct on alternate half cycles.

For the condition when the potentiometric measuring circuit 2 is balanced no voltage is induced in the transformer secondary winding 15 and accordingly the potentials of the control electrodes 50, 54 and 69 of the triodes 47, 48 and 64 remain substantially constant and therefore no signal is impressed upon the control electrodes 73 and 76 of the triodes 71 and 72.

Under these conditions a pulse of current flows from the anode 72A to the cathode 74 and thereby through the motor winding 34 during the first half cycle of the alternating voltage produced across the transformer secondary winding 31. During the second half cycle a pulse of current flows from the anode 75 to the cathode 77 and thereby through the motor winding 34. Since the control electrodes 73 and 76 are connected together, and since the potential of these control electrodes remain substantially constant when the potentiometric measuring circuit 7 is balanced, pulses of equal magnitude flow in the anode circuits of the triodes 71 and 72 during each succeeding half of the alternating voltage supplied by the transformer secondary winding 31. Thus, it will be noted that when the potentiometric measuring circuit 2 is balanced pulsating direct current of twice the frequency of the alternating voltage supplied by the transformer secondary winding 31 is supplied the motor winding 34. When thus energized the motor 10 is not effectively urged to rotation in either direction and remains stationary. Due to the relatively high direct current component of the current then flowing through the motor winding 34 the core structure of the motor 10 tends to become saturated whereby the inductive reactance of the motor winding 34 is relatively small. The condenser 108 is so selected that the condenser in parallel with the motor winding 34 then forms a parallel resonant circuit with the latter. It is noted that such saturation of the core structure of the motor 10 operates to exert an appreciable damping effect on the rotor 23, or in other words an effect tending to prevent rotation of the rotor 23. Thus, if the rotor 23 had been rotating, such saturation of the motor core structure will operate to quickly stop the rotor rotation.

Upon unbalance of the potentiometric measuring circuit 2 the magnitude of the pulses of current flowing in the anode circuit of one triode 71 or 72 will be increased and the magnitude of the pulses of current flowing in the anode circuit of the other triode decreased. When the motor field winding 34 is thus energized the direct current component of the current flowing therethrough is decreased whereby the saturation of the motor core structure and the consequent rotor damping effect is reduced. In addition the alternating component of the current supplied the winding 34 is increased. This alternating component produces an alternating field in the motor core structure which reacts with that established by the motor winding 33 to produce a rotating field in the motor. This rotating field rotates in one direction or the other depending upon the direction of potentiometric unbalance and effects actuation of the motor rotor 23 for rotation in a corresponding direction.

In accordance with the present invention the actuating winding 20 of the current interrupting device 17, and the motor windings 33 and 34 are energized from an alternating current source having a frequency which is different from the frequency of the current of the supply lines L¹ and L². By so energizing the circuit components 20, 33 and 34, the possibility of false balance points of the potentiometric network 2 and erratic and unstable operation due to the introduction of extraneous alternating currents of the frequency of the supply lines L¹ and L² or harmonics thereof into the input circuit of the electronic amplifier 1 from stray alternating fields or other alternating current sources in the vicinity of the apparatus is substantially eliminated. In other words, such extraneously induced currents of the frequency of the power supply lines L¹ and L² or any of its harmonic frequencies are rendered ineffective to cause a shift in the balance point of the potentiometric network 2 regardless of their phase. Only extraneously induced currents of the frequency utilized to energize the circuit parts 20, 33 and 34 or harmonics thereof can cause difficulty. The frequency of the current employed to energize the parts 20, 33 and 34, therefore is so chosen that there is little or no possibility of having currents of this frequency or its harmonics extraneously introduced into the electronic amplifier 1.

By way of example, when the frequency of the current of supply lines L¹ and L² is 60 cycles per second, the alternating current for energizing the interrupter winding 20 and the motor windings 33 and 34 may desirably have a frequency of 100 cycles per second. With energizing current of this frequency there may be some slight tendency for the motor 10 to tend to oscillate or periodically reverse its direction of rotation when a 60 cycle current is impressed on the motor winding 34, but the resultant field is ineffective for energizing the motor 10 for rotation. Consequently, the motor operation and the correct potentiometer balance point are not upset or disturbed as a result of the introduction of extraneous alternating currents of 60 cycle frequency into the electronic amplifier 1. That such operation as obtained may be readily shown mathematically or by vector analysis as will be seen by referring to Figs. 2, 3, 4 and 5.

Figs. 2, 3, 4 and 5 are graphic illustrations of the vector relations between the 60 and 100 cycle fields in the motor 10. Horizontal line 1—1 in each of these figures designates the direction in which the 60 cycle field builds up, falls off to zero and then builds up in the reverse direction while line 2—2 designates the direction in which the 100 cycle field alternately builds up in reverse directions. Lines 1—1 and 2—2 are positioned 90° apart since the field established by motor winding 33 is displaced 90° from that produced by motor winding 34. At the point of intersection of lines 1—1 and 2—2 both of the fields are zero in value.

Figure 2:
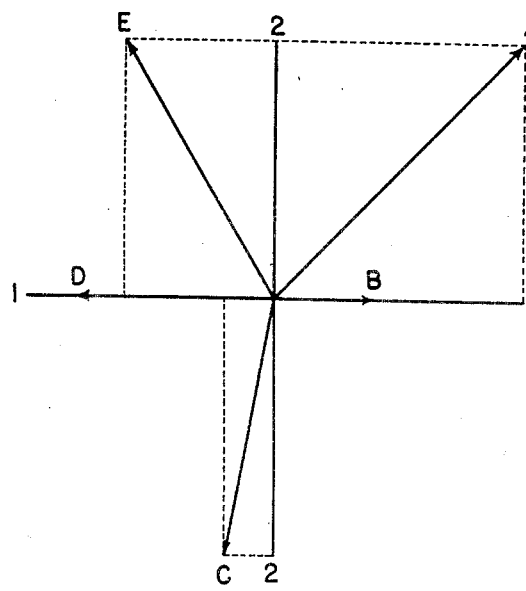
Figs. 2, 3, 4 and 5 are graphs illustrating vectorially the operation of the arrangement of Fig. 1.

Referring to Fig. 2, the vector designated by the character A represents the resultant of the 100 and 60 cycle fields when both of these fields are at their maximum value, which for convenience is the condition chosen as a starting point for the analysis of the reaction of the 100 and 60 cycle fields. For the purpose of this analysis the maximum value of both the 60 and 100 cycle fields are shown as being the same value.

Upon the passage of $1/400$ of a second, the 100 cycle field will have decreased to zero whereas the 60 cycle field will have fallen off only three-fifths of the way toward zero. The result of this action is a clockwise shift of the vector or resultant field from A to B. In successive intervals of $1/400$ of a second the vector or resultant field will shift to C, D and E. The shift of the vector or resultant field produced is approximately 284° for the case under consideration, namely when the maximum value of both the 60 and 100 cycle fields is the same value.

Figure 3:
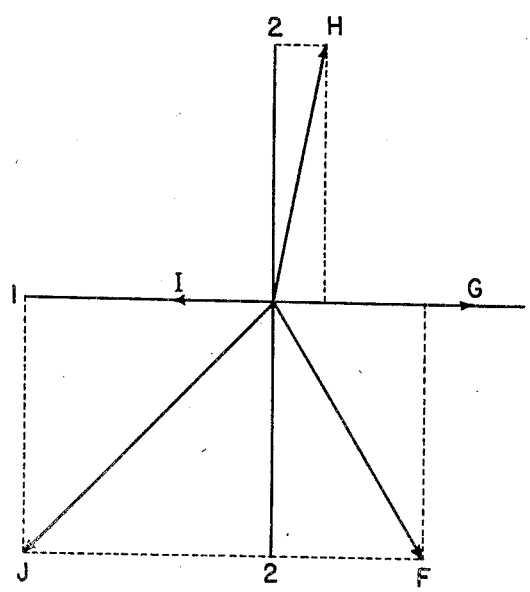

During the next $1/400$ of a second the vector or resultant field decreases to zero without shifting in position and then during the succeeding $1/400$ of a second builds up in the reverse direction as shown in Fig. 3 by the vector F. The resultant field in successive intervals of $1/400$ of a second shifts in a counter-clockwise direction to G, H, I and J, again shifting through approximately 284°.

Figure 4:
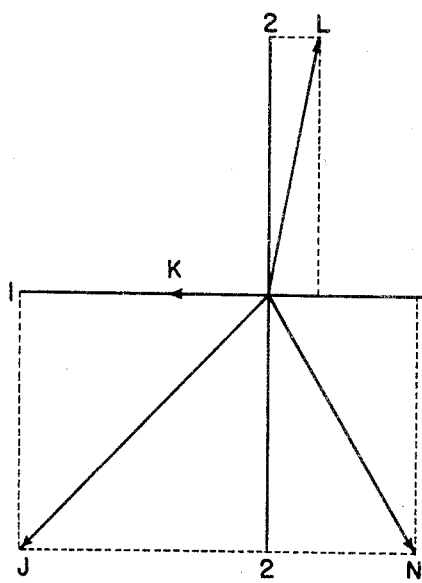

In the next $1/400$ of a second the resultant field reverses its direction of shift as shown in Fig. 4 wherein the resultant field shifts in the clockwise direction from J to K, while during succeeding intervals of $1/400$ of a second the resultant field shifts in a clockwise direction to L, M, and N.

Figure 5:
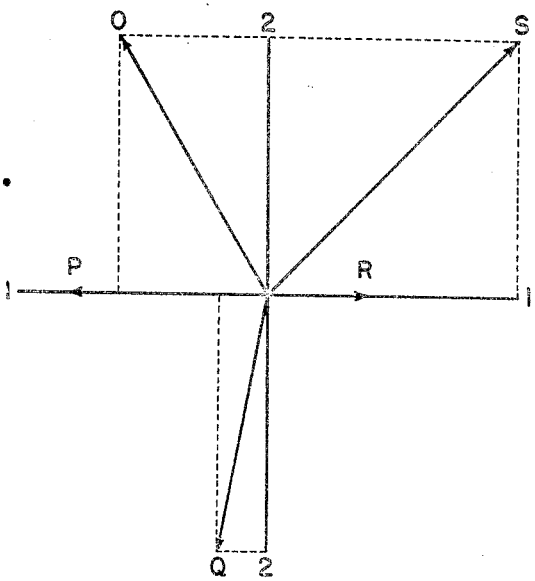

During the next $1/400$ of a second the resultant field decreases to zero without shifting in position and in the succeeding $1/400$ of a second the resultant field builds up in the reverse direction as is indicated in Fig. 5 by the vector O. The resultant field then, during succeeding intervals of $1/400$ of a second shifts in a counter-clockwise direction to P, Q, R and S, the shift again being approximately 284°.

The total time elapsed for this whole procedure is only $5/100$ of a second, during which time the resultant field will have reversed its direction of rotation four times. Since the vector S corresponds exactly to the vector A of Fig. 2, the establishment of a periodically reversing field as described in Figs. 2, 3, 4 and 5 will be continuously repeated. Accordingly, the resultant field in the motor reverses its direction eighty times a second. This rate of reversal is entirely too high for any significant response by the rotor 23 of motor 10, and at most produces only a small amplitude tremor or oscillation of the rotor. In addition there is only a partial revolution of the field in each direction of rotation. As a result of this operation the motor 10 does not respond to extraneous alternating currents of supply line frequency, namely 60 cycles, which may be induced in the potentiometric network or in the electronic amplifier.

As will be recognized by those skilled in the art, the superposition of 60 cycle extraneously induced currents on the 100 cycle motor energizing currents introduced in the winding 34 upon potentiometric unbalance will produce a component of current having a frequency of 40 cycles per second in the motor phase winding 34. This 40 cycle current component in the motor winding 34 will establish a field in the motor which will react with the 100 cycle field established in the motor by the 100 cycle energizing current in the motor field winding 33 to produce a resultant rotating field in the motor which will periodically reverse its direction one hundred times a second and, moreover, will also make only a partial revolution before reversing its direction of rotation. That this action is obtained may also be readily shown mathematically or by vector analysis similar to that of Figs. 2, 3. 4 and 5. In carrying out such analysis it is noted that as the vertical or 100 cycle component of the resultant field vector changes from a zero to a maximum value, the 40 cycle or horizontal component will only change two-fifths of the way between its zero and maximum values.

While such an alternating current of 100 cycles per second for energizing winding 20 of the interrupter 17 and the motor windings 33 and 34 may be derived from the alternating current power supply conductors $L^1$ and $L^2$ by means of any suitable rotary or other frequency converter, I have illustrated in the drawings one suitable type of frequency converter, which may advantageously be so employed. The frequency converter illustrated consists of an electromagnet generally indicated at 109 which includes a core 110 and an electromagnetic coil 111 which is wound on the core 110.

A vibratory reed 112 is positioned substantially in parallel relation with the coil 111 and is operatively disposed between a pair of contact arms 113 and 114. The reed 112 consists of a main blade 115 and an auxiliary blade 116 secured to one end thereof, such blades carrying suitable contacts on their opposite faces. The core 110 of the electromagnet is bent as at 117 and extends adjacent the free end of the reed to which a block of magnetic material indicated at 118 is secured. The core 110, the reed 112 and the contact carrying blades 115 and 116 are all supported at one end only in a pillar formed by the ends of such members and alternate layers of insulating material as at 119. The pillar is provided with an aperture through which a bolt 120 extends and by means of which the several components of the pillar are rigidly secured to a supporting base 121. The bolt 120 is electrically connected with the reed 112 by means of a block of electrically conductive and magnetic material 122 which is in threaded engagement with the bolt 120.

As illustrated the reed 112 is electrically connected by the bolt 120 and a conductor 123 to the negative output terminal of the filter 84, which terminal is also connected to one side of the electromagnetic coil 111. The contact carrying blades 113 and 114 are connected by conductors 124 and 125, respectively, to the opposite ends of the transformer primary winding 30. The other terminal of the coil 111 is connected by a conductor 126 to the contact 114. The positive output terminal of the filter 84 is connected by a conductor 127 to the center tap on the transformer primary winding 30.

In this arrangement current flows from the negative output terminal of the filter 84 through the electromagnetic coil 111, conductors 126 and 125 to the left end terminal of winding 30 and through winding 30 and conductor 127 to the positive output terminal of the filter. This current flow operates to energize the coil 111 forming an electromagnet of the core 110. The pole piece 117 of the core 110 will, when energized in this manner, attract the block of magnetic material 118 secured to the end of reed 112. Such attraction of the block 118 moves the reed 112 into contact with the lower contact blade 114 to thereby short circuit the coil 111 through the conductor 126. This reduces the current flow through the coil 111 so that the strength of the electromagnet is no longer sufficient to overcome the spring action of the reed 112 whereupon the latter will snap up and over-carry into contact with the upper contact blade 113.

When the reed 112 makes contact with the upper blade 113 a flow of current will be established through the right half of the transformer primary winding 30 as seen in the drawings but in a direction opposite to the preceding flow of current in the left half of the winding 30. Vibration of the reed 112 between the contact blades 113 and 114 will, therefore, result in the establishment of an alternating magnetic flux threading the secondary windings 28, 31 and 32 of the transformer 29.

As soon as contact between the reed 112 and the lower contact blade 114 is broken, the coil 111 is again energized so that the magnet again asserts its influence on the magnetic block 118 to move the reed back into engagement with the contact blade 113, thereby maintaining continuous vibration of the reed between the contact blades 113 and 114 at a rate depending upon the natural period of the several moving parts of the apparatus so that each of the moving parts is permitted to vibrate to a certain extent. The apparatus is so designed that the rate of vibration of the several moving parts is that required to produce an alternating current having a frequency of approximately 100 cycles per second in the transformer secondary windings 28, 31 and 32. It will be understood, however, that if desired, the apparatus may be designed to produce alternating currents of any other suitable frequency which may advantageously be utilized for energizing the coil 20 of the current interrupting device 17 and the motor 10 as required to eliminate the undesirable effects of extraneously induced currents of power line or other frequencies in the input circuit of the electronic amplifier 1.

As will be understood from the foregoing description, the embodiment of the present invention disclosed is characterized in that it will not permit shifts in the balance point of the potentiometric network 2 or erratic or unstable operation of the potentiometric network when extraneous alternating voltages of any frequency other than the frequency selected for the operation of the current interrupting devices 17 and 109 and the motor 10 are extraneously introduced into the input circuit of the electronic amplifier 1. While such extraneously induced voltages do not adversely affect the balance point or the manner of operation of the apparatus, it is noted, however, that extraneously introduced voltages of excessive magnitude may cause a decrease in the sensitivity of the electronic amplifier even though the balance point is not upset. However, when provisions are made for limiting the magnitude of such extraneous voltages the arrangement disclosed herein will always insure accurate balance of the potentiometric network 2. Such provisions may comprise the introduction of a suitable filter between the transformer secondary winding and the input circuit of the triode 47 of valve 46 for limiting the magnitude of the extraneously introduced currents applied to the input circuit of triode 47, for example. One suitable arrangement for so eliminating or reducing the magnitude of the extraneous voltages induced in the potentiometric network 2 is disclosed and is being claimed in my copending application Serial Number 466,130, filed November 19, 1942, issued into Patent 2,355,537 on August 8, 1944

It will be apparent that the reversible electrical motor 10 may be employed to operate a valve 128 positioned in a fuel supply pipe 129 for varying the supply of heating agent to the furnace to the temperature of which the thermocouple 3 is responsive, or preferably, a separate reversible electrical motor may be so employed. For example, as illustrated in the drawings, a reversible electrical motor 130 having two opposed field windings (not shown) may be used for this purpose. The reversible motor 130 is mechanically connected in any suitable manner to the valve 128 and is adapted to adjust the latter to its opened and closed position depending upon the direction to which the motor 130 is energized for rotation. The mechanical connection of the motor 130 to the valve 128 is such as to increase and decrease the supply of heating agent to the furnace as the temperature of the latter falls below or rises above a predetermined level.

The motor 130 is energized for rotation in one direction or the other, depending upon which of the two opposed field windings is energized, by means of a switch 131. As shown, current flows from the alternating current supply conductor L¹ through conductor 132 to a switch arm 133 which is insulated from but may be carried by the carriage 8 which carries the potentiometer slidewire contact 7, thence by either of two opposed contacts 134 or 135, conductors 136 or 137 and one field winding or the other field winding of the motor 130 to the supply conductor L². Although not shown the contacts 134 and 135 of the switch 131 are made adjustable so that both the control point setting and sensitivity of the apparatus may be set in a manner well known in the art.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Apparatus for measuring the magnitude of a direct current electric potential of unknown magnitude including a 60 cycle per second source of alternating voltage, means to rectify said alternating voltage to produce a direct current voltage, means operated by said direct current voltage to produce a 100 cycle per second alternating voltage, means to produce a direct current potential of known magnitude, a circuit to oppose said known direct current potential to said unknown direct current potential to derive a differential potential, circuit interrupting means in said circuit to convert said differential potential into a fluctuating potential, said circuit interrupting means including an operating winding energized by said 100 cycle per second alternating voltage whereby the frequency of said fluctuating potential is 100 cycles per second, amplifying means including electronic valve means to amplify said fluctuating potential, said electronic valve means including an input circuit on which said fluctuating potential is impressed and an output circuit energized by said direct current voltage, means including a two-phase reversible electrical rotating field motor having a pair of phase windings to reduce said differential potential, means to apply said amplified fluctuating potential to one phase winding of said motor, means to apply said 100 cycle per second alternating voltage to the other phase winding of said motor, and means to cause a phase displacement in the current flow through said last mentioned phase winding with respect to the current flow in the first mentioned phase winding.

2. Apparatus for measuring the magnitude of a direct current electrical potential of unknown magnitude including a source of alternating voltage, means to rectify said alternating voltage to produce a direct current voltage, means operated by said direct current voltage to produce an alternating voltage of frequency different than said first mentioned alternating voltage and different than the harmonic frequencies of the latter, means to produce a direct current potential of known magnitude, a circuit to oppose said known direct current potential to said unknown direct current potential to derive a differential potential, circuit interrupting means in said circuit to convert said differential potential into a fluctuating potential, said circuit interrupting means including an operating winding energized by said second mentioned alternating voltage whereby said fluctuating potential is of the same frequency as said second mentioned alternating voltage, amplifying means including electronic valve means to amplify said fluctuating potential, said electronic valve means including an input circuit on which said fluctuating potential is impressed and an output circuit energized by said direct current voltage, means including a two-phase reversible electrical rotating field motor having a pair of phase windings to reduce said differential potential, means to apply said amplified fluctuating potential to one phase winding of said motor, means to apply said second mentioned alternating voltage to the other phase winding of said motor, and means to cause a phase displacement in the current flow through the last mentioned phase winding with respect to the current flow in the first mentioned phase winding.

3. Apparatus for measuring the magnitude of a direct current electrical potential of unknown magnitude including a source of alternating voltage, means to rectify said alternating voltage to produce a direct current voltage, means operated by said direct current voltage to produce an alternating voltage of frequency different than said first mentioned alternating voltage and different than the harmonic frequencies of the latter, means to produce a direct current potential of known magnitude, a circuit to oppose said known direct current potential to said unknown direct current potential to derive a differential potential, circuit interrupting means in said circuit to convert said differential potential into a fluctuating potential, said circuit interrupting means including an operating winding energized by said second mentioned alternating voltage whereby said fluctuating potential is of the same frequency as said second mentioned alternating voltage, and motive structure having a connection with said second mentioned alternating voltage and controlled by said fluctuating potential to reduce said differential potential, said motive structure being responsive to the frequency of said fluctuating potential but not to the frequency of said first mentioned alternating voltage.

4. Apparatus for measuring the magnitude of a direct current electrical potential of unknown magnitude including a source of alternating voltage, means to rectify said alternating voltage to produce a direct current voltage, means operated by said direct current voltage to produce a fluctuating voltage of frequency different than said first mentioned alternating voltage and different than the harmonic frequencies of the latter, means to produce a direct current potential of known magnitude, a circuit to oppose said known direct current potential to said unknown direct current potential to derive a differential potential, means energized by said fluctuating voltage to convert said differential potential into a fluctuating potential of one phase or of opposite phase depending upon the polarity of said differential potential and of the same frequency as said fluctuating voltage, and phase responsive means controlled by said fluctuating potential to reduce said differential potential, said phase responsive means being responsive to the frequency of said fluctuating potential but not to the frequency of said first mentioned alternating voltage.

5. Apparatus for measuring the magnitude of a direct electrical potential of unknown magnitude including a source of direct current voltage, means operated by said direct current voltage to produce an alternating voltage, means to produce a direct current potential of known magnitude, a circuit to oppose said known direct current potential to said unknown direct electrical potential to derive a differential potential, circuit interrupting means energized by said alternating voltage and connected in said circuit to convert said differential potential into a fluctuating potential, amplifying means including electronic valve means to amplify said fluctuating potential, said electronic valve means including an output circuit energized by said alternating voltage and an input circuit, means to impress said fluctuating potential on the input circuit of said amplifying means, the frequency of said fluctuating potential being the same as that of said alternating voltage but different from the frequency and the harmonics thereof of an extraneous fluctuating current which may be superimposed on the input circuit of said amplifying means, means including a two-phase reversible electrical rotating field motor having a pair of phase windings to reduce said differential potential, means to apply said amplified fluctuating potential to one phase winding of said motor, means to apply said alternating voltage to the other phase winding of said motor, and means to cause a phase displacement in the current flow through said last mentioned phase winding with respect to the current flow in the first mentioned phase winding.

6. Apparatus for measuring the magnitude of a direct electrical potential of unknown magnitude including a source of direct current voltage, means operated by said direct current voltage to produce an alternating voltage, means to produce a direct current potential of known magnitude, a circuit to oppose said known direct current potential to said unknown direct electrical potential to derive a differential potential, circuit interrupting means energized by said alternating voltage and connected in said circuit to convert said differential potential into a fluctuating potential, means including a two-phase reversible electrical motor having a pair of phase windings to reduce said differential potential, electronic amplifying means having a preliminary amplifying section and a motor driving section controlled by said preliminary amplifying section, means to apply said fluctuating potential to the input circuit of said preliminary amplifying section, the frequency of said fluctuating potential being the same as that of said alternating voltage but different from the frequency and the harmonics thereof of a fluctuating current which may be superimposed on the input circuit of said preliminary amplifying section, a connection between said direct current voltage and the output circuit of said preliminary amplifying section for energizing the latter, a connection between said alternating voltage and the output circuit of said motor driving section including one phase winding of said motor, means to apply said alternating voltage to the other phase winding of said motor, and means to cause a phase displacement in the current flow through said last mentioned phase winding with respect to the current flow in the first mentioned phase winding.

7. Apparatus for measuring the magnitude of a direct electrical potential of unknown magnitude including a source of direct current voltage, means operated by said direct current voltage to produce an alternating voltage, means to produce a direct current potential of known magnitude, a circuit to oppose said known direct current potential to said unknown direct electrical potential to derive a differential potential, means to convert said differential potential into a fluctuating potential of one phase or of opposite phase depending upon the polarity of said differential potential, means to amplify said fluctuating potential, and phase responsive means having a connection with said alternating voltage and controlled by the amplified quantity of said fluctuating potential to reduce said differential potential, said phase responsive means being responsive to the frequency of said fluctuating potential but not to the frequency and the harmonics thereof of an extraneous fluctuating potential which may be superimposed on the amplified quantity of said fluctuating potential.

HARRY S. JONES.